(12) United States Patent
Morgan

(10) Patent No.: US 12,225,952 B2
(45) Date of Patent: Feb. 18, 2025

(54) WATER SPORT ARTICLE JOINT AND A METHOD FOR MANUFACTURING A WATER SPORT ARTICLE JOINT

(71) Applicant: NIKE, Inc., Beaverton, OR (US)

(72) Inventor: Daniel Morgan, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 898 days.

(21) Appl. No.: 17/040,221

(22) PCT Filed: Mar. 4, 2019

(86) PCT No.: PCT/US2019/020611
§ 371 (c)(1),
(2) Date: Sep. 22, 2020

(87) PCT Pub. No.: WO2019/182748
PCT Pub. Date: Sep. 26, 2019

(65) Prior Publication Data
US 2021/0007421 A1    Jan. 14, 2021

Related U.S. Application Data

(60) Provisional application No. 62/647,558, filed on Mar. 23, 2018.

(51) Int. Cl.
*A41D 13/012* (2006.01)
*A41D 27/24* (2006.01)
(Continued)

(52) U.S. Cl.
CPC ......... *A41D 13/012* (2013.01); *A41D 27/245* (2013.01); *B29C 65/50* (2013.01);
(Continued)

(58) Field of Classification Search
CPC .. A41D 13/012; B63C 11/04; B63C 2011/046
See application file for complete search history.

(56) References Cited

U.S. PATENT DOCUMENTS 3,246,621 A * 4/1966 Copeland ............... A41D 27/24
428/102
3,294,617 A * 12/1966 Way ..................... B29C 66/836
156/244.11
(Continued)

FOREIGN PATENT DOCUMENTS

EP      2238850 A1   10/2010
FR      2577764 A1    8/1986
(Continued)

OTHER PUBLICATIONS

European Patent Office (ISA), International Search Report and Written Opinion for PCT Application No. PCT/US2019/020611, mailed May 20, 2019.
(Continued)

*Primary Examiner* — Alissa L Hoey
(74) *Attorney, Agent, or Firm* — Honigman LLP; Matthew H. Szalach; Jonathan P. O'Brien

(57) ABSTRACT

A water sport article is provided. The water sport article includes a joint formed between a first panel having a greater thickness than a second panel. The joint includes an overlapping interface between the first and second panels where one or more of adhesive bonding, blind stitching, and taping is used to attach the first and second panels at the overlapping interface.

11 Claims, 6 Drawing Sheets

(51) Int. Cl.
  *B29C 65/00* (2006.01)
  *B29C 65/50* (2006.01)
  *B63C 11/04* (2006.01)
  *B29L 31/48* (2006.01)
  *B29L 31/52* (2006.01)

(52) U.S. Cl.
  CPC .......... *B29C 66/1122* (2013.01); *B63C 11/04* (2013.01); *B29L 2031/48* (2013.01); *B29L 2031/5254* (2013.01); *B63C 2011/046* (2013.01)

(56) References Cited

U.S. PATENT DOCUMENTS

| | | | | |
|---|---|---|---|---|
| 3,686,064 A | * | 8/1972 | Bonnet et al. | B29C 66/72343 442/221 |
| 4,741,050 A | * | 5/1988 | O'Kane | A41D 27/24 2/82 |
| 4,882,785 A | * | 11/1989 | Long | B29C 66/1142 428/314.4 |
| 4,931,335 A | * | 6/1990 | Long | B29C 66/1142 428/57 |
| 4,999,845 A | * | 3/1991 | Jenks, Jr. | A41D 13/012 2/82 |
| 5,630,229 A | * | 5/1997 | Machado | A41D 13/012 2/2.15 |
| 5,901,374 A | * | 5/1999 | Foster | A41D 13/012 2/242 |
| 6,124,010 A | * | 9/2000 | Shih | B29C 66/861 428/61 |
| 6,415,449 B2 | * | 7/2002 | Duplock | B32B 5/026 112/419 |
| 6,514,590 B1 | * | 2/2003 | Shih | B29C 66/73161 428/61 |
| 7,051,375 B2 | * | 5/2006 | Polak | B63C 11/04 2/82 |
| 7,096,506 B2 | * | 8/2006 | Ragot | B63C 11/04 2/2.15 |
| 7,117,545 B2 | * | 10/2006 | Hannon | B29C 66/0224 2/275 |
| 7,770,235 B2 | * | 8/2010 | Lepage | B29C 66/43 2/82 |
| 8,393,012 B2 | * | 3/2013 | Shiue | A41D 13/012 2/2.15 |
| 8,539,612 B2 | * | 9/2013 | Shiue | B29C 66/0382 2/2.15 |
| 8,580,074 B2 | * | 11/2013 | Shiue | B29C 66/71 156/331.7 |
| 9,290,119 B2 | * | 3/2016 | Tabata | D05B 11/00 |
| 10,531,697 B2 | * | 1/2020 | Hussey | A41D 27/245 |
| 11,535,010 B2 | * | 12/2022 | Shiue | B32B 37/10 |
| 2003/0126673 A1 | * | 7/2003 | Yardley | B29C 66/1122 2/272 |
| 2007/0000002 A1 | * | 1/2007 | Shiue | B63C 9/093 2/2.15 |
| 2007/0294797 A1 | * | 12/2007 | Furgerson | B63C 9/093 2/2.15 |
| 2009/0317580 A1 | * | 12/2009 | Roiser | B29C 66/43 428/61 |
| 2010/0162462 A1 | * | 7/2010 | Shih | B29C 66/43 2/243.1 |
| 2012/0023631 A1 | * | 2/2012 | Fischer | B63C 11/04 2/2.15 |
| 2012/0304369 A1 | * | 12/2012 | Carmichael | A41D 13/012 2/464 |
| 2014/0338089 A1 | * | 11/2014 | Brooks | A41D 13/012 2/2.15 |
| 2016/0157532 A1 | * | 6/2016 | Shiue | B29C 66/43 2/2.15 |
| 2017/0127735 A1 | * | 5/2017 | Wiles | A41D 13/065 |
| 2021/0229785 A1 | * | 7/2021 | Gordon | A41D 31/02 |

FOREIGN PATENT DOCUMENTS

| | | |
|---|---|---|
| GB | 2549620 A | 10/2017 |
| WO | WO-2008002430 A2 | 1/2008 |

OTHER PUBLICATIONS

Australian Examination Report for Application 2019237923 dated Apr. 22, 2021.

* cited by examiner

WATER SPORT ARTICLE JOINT AND A METHOD FOR MANUFACTURING A WATER SPORT ARTICLE JOINT

CROSS REFERENCE TO RELATED APPLICATIONS

The present application is a 371 National Stage entry based on International Application No. PCT/US2019/020611, entitled "A WATER SPORT ARTICLE JOINT AND A METHOD FOR MANUFACTURING A WATER SPORT ARTICLE JOINT," and filed on Mar. 4, 2019, which claims priority to U.S. Provisional Application No. 62/647,558, entitled "A WATER SPORT ARTICLE JOINT AND A METHOD FOR MANUFACTURING A WATER SPORT ARTICLE JOINT," and filed on Mar. 23, 2018. The entire contents of the above-identified applications are hereby incorporated by reference for all purposes.

FIELD

The present description relates generally to a joint between two panels in a water sport article and a method for manufacturing the joint.

BACKGROUND

Articles, including apparel, equipment, and accessories, used in water sports such as surfing, waterskiing, diving, boating, etc., may be submerged or surrounded by water for extended periods of time. To decrease exposure of objects or body parts covered by the articles from water the articles may be formed from waterproof materials. It may be desirable for the articles to include waterproof seams or joints to further reduce penetration of water through the article.

DETAILED DESCRIPTION

Figure 1:
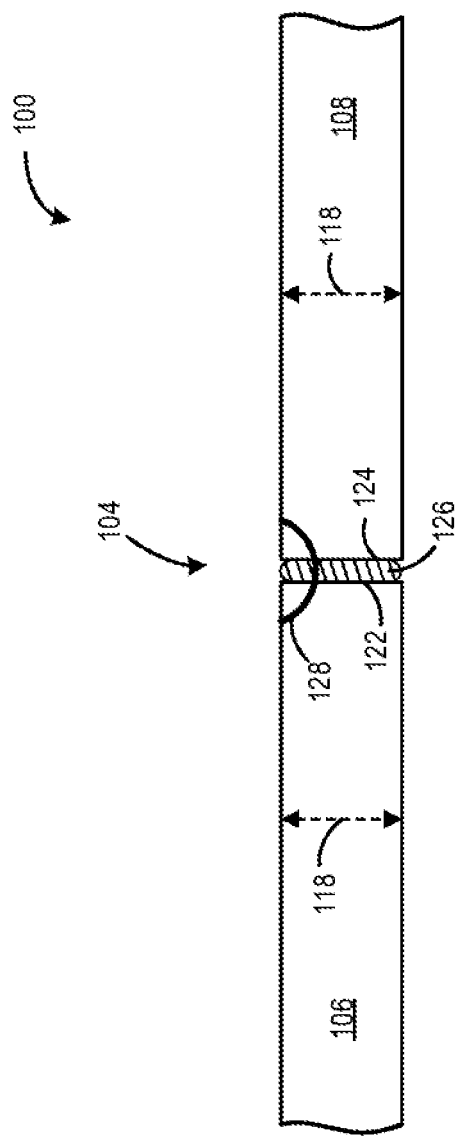
FIG. 1 shows an example of a conventional water sport article joint.

Water sport apparel, equipment, and accessories may be formed from materials that provide thermal insulation, buoyancy, and/or abrasion resistance, as well as, in the case of apparel, allowance for freedom of motion of the wearer. Such materials impart a desired waterproofness. As described herein, waterproofness is defined as a resistance to penetration by liquid water. In one specific example, a material may be considered waterproof if the material is able to withstand a pressure of over 1,000 millimeters (mm) of water without leaking. However, numerous suitable threshold pressures may be used as metrics for indicating material waterproofness. Waterproof materials for water sport apparel, equipment, and accessories may include synthetic rubbers (e.g., neoprene), natural rubber, foams such as foamed thermoplastic polyurethane (TPU), etc. Characteristics of the material such as insulation, buoyancy, flexibility, etc., may be affected by a thickness of the material. For example, neoprene may include microcells trapping air and reducing heat transfer from the wearer's body to water by providing an insulating layer of air that is less heat conducting than water. The thicker the neoprene, the more microcells are positioned between the wearer's body and surrounding water, increasing the insulating effect of the material.

For instance, a diver may desire a neoprene wetsuit of 5-7 mm thickness for scuba diving off the coast of northern California where waters may be around 50° F. for example, whereas a surfer in Hawaii that may experience winter water temperatures of around 77° F. for example may find that a 1 mm thick neoprene shirt provides a desired amount of insulation. However, increasing the thickness of the water sport garment may lead to issues with flexibility.

The flexibility of a material is the ability of the material to deform elastically, e.g., stretch, in response to a force and return to its original shape when the force is removed. For example, a flexibility of a material used in wetsuits or other water sport articles may be measured by the ASTM D1388 standard test method for stiffness of fabrics. Thus, the flexibility of a material may be quantified using the material's bending stiffness, in one example. However, it will be appreciated that different techniques may be used to quantify wetsuit flexibility and wetsuits may have other ranges of flexibility, in other examples. The flexibility of neoprene may be based on a number of crosslinking sulfur groups between polymer chains. Increasing the thickness of the material of the water sport garment therefore may increase the number of sulfur crosslinks which may reduce the flexibility of the garment and lead to an undesirable restriction in range of motion of the wearer. As an example, if a surfing wetsuit is uniformly formed from 5 mm thick neoprene, a surfer wearing the wetsuit may experience a desired amount of insulation for surfing in cold waters but the 5 mm thick sleeves of the wetsuit may offer low flexibility, impeding the surfer's ability to paddle.

In order to maintain a continuous layer of protection from low water temperatures, panels of the wetsuit may be coupled in a manner that attempts to inhibit flow of water between the panels. A prior art system for coupling two panels of a wetsuit 100 is shown in FIG. 1. A seam 104 is formed between a first panel 106 and a second panel 108 of the wetsuit 100. The first panel 106 and the second panel 108 have equivalent thicknesses 118.

At the seam 104, an edge 122 of the first panel 106 is arranged adjacent to and parallel with an edge 124 of the second panel 108. In between the edge 122 and the edge 124, a layer of adhesive 126 is disposed therein. A plurality of stitches 128 extend across the seam 104. The stitches 128 penetrate top surfaces of the first and second panels 106, 108 at points on either side of the seam 104 that are spaced away from the seam 104.

The inventors herein have recognized potential issues with the seam structure shown in FIG. 1. For instance, in the seam 104 shown in FIG. 1, the amount of adhesive applied between the section panels is limited by the thickness of the thinner panel. Thus, in some scenarios, unwanted tradeoffs may be made between panel thickness and adhesive bonding strength. Additionally, the panels of the seam 104 shown in FIG. 1 have equivalent thicknesses, preventing adjustments in flexibility and insulation in targeted regions of garments incorporating the seam. It may be desirable to vary the thickness of panels of the water sport garment to enable some panels to have increased insulation while achieving increased flexibility in other regions. However, difficulties may arise when conventional stitching techniques are used to attach panels with varying thicknesses. For example, sewing abutting panels with a large variance in thickness may necessitate a level of precision that may be difficult or in some cases impossible to achieve using conventional sewing machines. Consequently, errors in the panel stitching may be increased. For instance, some stitches may miss the thinner panel, leading to a misaligned seam with gaps through which water may penetrate. The ability of the seam structure to block water is thus reduced, which, in turn, decreases the thermal insulating performance of the waterproof section. Missed stitches may also increase the play in the stitching, further increasing water penetration through the joint and decreasing the joint's strength. Therefore, the joint may be poorly secured and sealed when the panels have different thicknesses and are stitched at an abutting region. These attachment issues therefore result in decreased durability and longevity as well as increased water penetration into the water sport article.

A water sport article with a joint formed between a first panel and a second panel having varying thicknesses is described herein that overcomes at least some of the aforementioned problems. The joint includes an overlapping interface where an edge of the first panel is offset from an edge of the second panel. Adhesive bonding, blind stitching, and/or taping may be used to attach the first panel to the second panel at the overlapping interface. In this way, two panels of a water sport article with varying degrees of flexibility may be coupled such that heat retention and waterproofness of the panel joint are increased when compared to previous joints in water sport articles. Furthermore, by overlapping the panels the likelihood of stitching errors (e.g., stitching misalignment, mistakes in stitching penetration (e.g., stitches that penetrate past a targeted panel depth or fall short of the targeted panel depth), etc.,) may be reduced, if desired. Consequently, the play in the stitching is decreased resulting in an increase in the strength of the joint as well as an increase in the joint's waterproofness.

Figure 2:
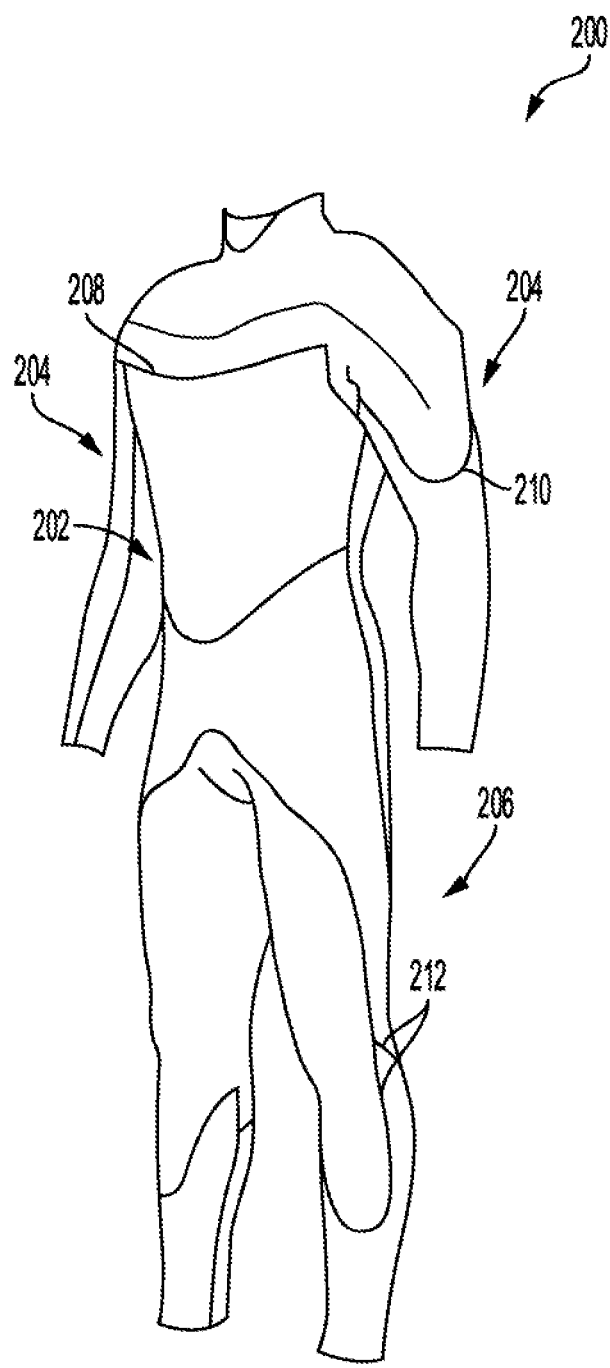
FIG. 2 shows a perspective view of a water sport article.
Figure 7:
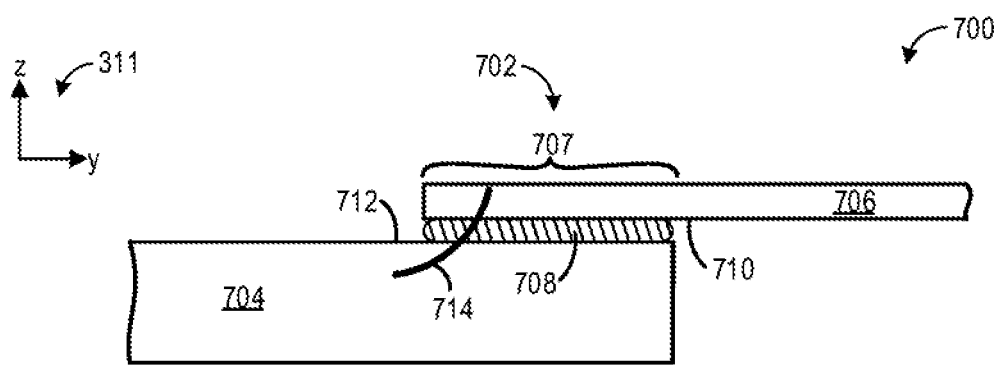
FIG. 7 shows a cross-sectional view of another example of a water sport article section with a joint having panels coupled by a combination of adhesive bonding and stitching.
Figure 8:
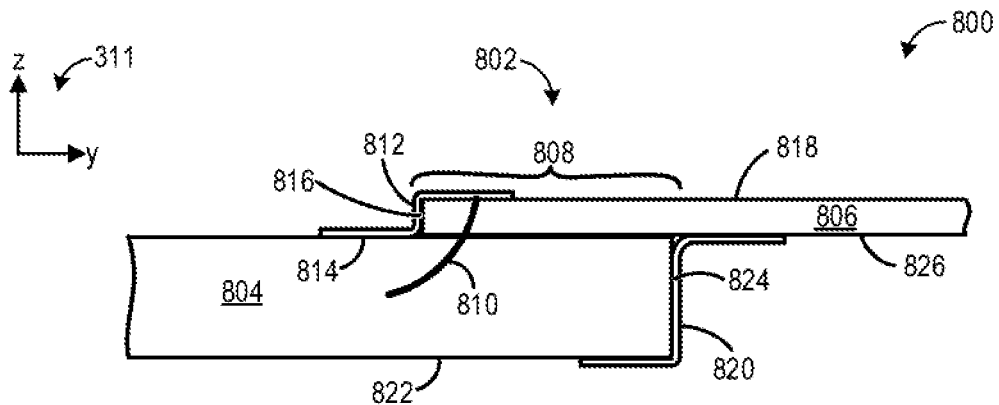
FIG. 8 shows a cross-sectional view of another example of a water sport article section with a joint having panels coupled by a combination of taping and stitching.
Figure 9:
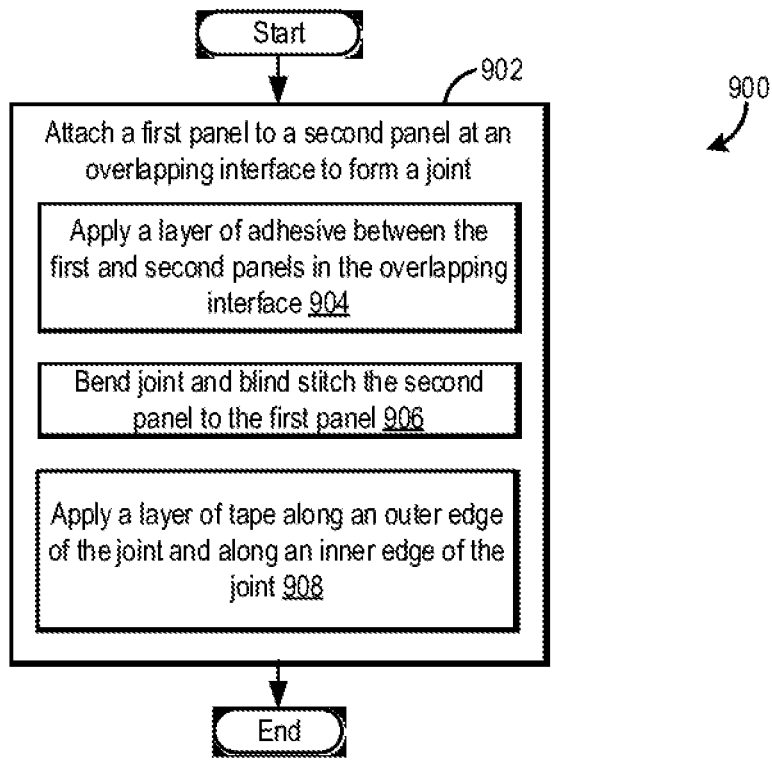
FIG. 9 shows a manufacturing method for a water sport article.

FIG. 2 shows an example of a water sport article. FIGS. 3-6 show a sequence for manufacturing a water sport article section that may be included in the water sport article, shown in FIG. 2, or in other suitable water sport garments, accessories, equipment, etc. FIGS. 7 and 8 show water sport article sections where different examples of combinations of coupling strategies are used to attach panels of the article. FIG. 9 shows a method for manufacturing a water sport article.

An example of a water sport article 200 that may be worn for thermal insulation is shown in FIG. 2. In the illustrated example, the water sport article 200 is a wetsuit. However, other types of water sport articles have been contemplated such as drysuits, pants, shirts, hoodies, footwear (e.g., booties), gloves, water sports equipment, and/or accessories (e.g., bags, backpacks, soft-sided coolers, etc.), etc.

Continuing with FIG. 2, the water sport article 200 may be formed from one or more sections including a plurality of panels connected by a plurality of joints. A panel, as described herein, may be a continuous piece of material which may be attached together with other panels to form an article. The sections may include a trunk 202 that may at least partially surround a torso of the wearer, as well as sleeves 204 and pants 206 that extend from the trunk 202. The plurality of joints (e.g., seams) may attach panels of the water sport article 200, such as the sleeves 204 and pants 206 to various edges of the trunk 202. A joint (e.g., seam), as described herein, may be an attachment interface between adjacent panels. For instance, adjacent panels may be sewn, adhesively bonded, and/or taped to one another.

For example, a first joint 208 may be arranged along a chest of the water sport article 200, extending across a width of the chest. A material of the water sport article 200 below the first joint 208 may be thicker than a material above the first joint 208 and covering the shoulders of the wearer. Decreasing the thickness of the shoulder region of the water sport article 200 may provide increased flexibility to the shoulder region of the water sport article 200 so that the wearer may rotate their arms with less restriction than if the material of the shoulder area was of the same thickness as the material below the first joint 208. Thus, panels of the water sport article 200 may have varying thicknesses. Additionally, the panels in the water sport article 200 may also have varying surface areas.

A set of second joints 210 may be arranged in the sleeves 204 at a region adjacent and above the wearer's elbows. A material of the sleeves 204 extending from the set of second joints 210 to an end of the sleeves through which the wearer's hands protrude may be thinner than the material of the shoulders of the water sport article 200. By decreasing a thickness of the sleeves below the set of second joints 210, the wearer may experience less resistance from the water sport article 200 to bending of the wearer's arms at the elbows. Similarly, a set of third joints 212 may be positioned on a posterior face of the pants 206 of the water sport article 200 and aligned with knees of the wearer. A material of the pants 206 below the set of third joints 212 may be thinner than a material above the set of third joints 212 and a material of an anterior face of the pants 206. More thermal insulation may be provided by protecting the wearer's thighs and anterior side of the lower legs with thicker material, as the wearer's legs may be submerged in water during participation in water-based activities, while the thinner material behind the knees of the wearer reduces restriction to bending of the wearer's knees. However, numerous panel and joint contours, positions, thicknesses, etc., have been contemplated and are possible with implementation of the methods described herein.

The varying thicknesses of the panels of the water sport article 200 may increase an efficiency of movement and conservation of energy of the wearer, if desired, by providing greater flexibility of the material of the water sport article 200 at regions that may coincide with articulation of the wearer's body when worn and the water sport article is in an as-worn position. An as-worn position is a configuration of the article where the article is worn (e.g., donned) by a user. For instance, the joints may be arranged adjacent to a user's shoulders, knees, elbows, waist, torso, ankles, wrists, etc. To maintain insulating properties of a water sport article and/or reduce interaction between the wearer and externally surrounding water, joints, such as the first, second, and third sets of joints 208, 210, 212 of FIG. 2 may be sealed to block water flow.

When donning the wetsuit, the material of the wetsuit may be subjected to rigorous pulling and stretching, in certain circumstances. Consequently, the joints in the water sport article 200 may be configured to withstand forces prone to pulling panels of the joints apart. Joint attachment techniques facilitating this robust attachment are described in greater detail herein.

Additionally, the panels in the water sport article 200, shown in FIG. 2, may be constructed out of a synthetic rubber such as neoprene (e.g., foamed neoprene) or a blend of neoprene and butyl rubber. The foamed neoprene may be an expanded rubber foam formed from closed cells filled with nitrogen gas. The mixing of butyl rubber with neoprene increases an elasticity of the material, thus water sport articles configured with a high degree of stretch may contain a higher percentage of butyl rubber, if desired. A layer of neoprene may be sandwiched between thin sheets of a more durable material such as nylon or elastane, in some examples. In other examples, the neoprene may be lined on one side (e.g., an inner side) while an outer side of the neoprene is cured to form a smooth or knobby skin. In yet another example, the inner side of the neoprene material may be coated with a finish that is hydrophilic to reduce (e.g., minimize) space between the material and wet skin of a wearer, thereby reducing water flow there through. Furthermore, other types of fabric may be laminated to a surface of the neoprene, depending on desired material properties. For example, a para-aramid synthetic fiber may be used to resist abrasion, fleece may be used to increase heat retention, nylon to aid donning and taking off the article as well as to reduce the likelihood of abrasive wear and solar degradation to article's material construction, etc.

In additional or alternative examples, the sections of the water sport article 200, shown in FIG. 2, may include a layer of polyurethane between elastane and polyester fleece providing insulating properties. Other synthetic rubbers, such as Ariaprene™ and Neogreene®, waterproof and/or water resistant foams (e.g., closed cell foams such as foamed Thermoplastic polyurethane (TPU), combinations thereof, etc.,) may be used in the sections of the water sport article (e.g., garment, water sport equipment, accessory, etc.) The water sport article may additionally or alternatively include a natural rubber such as guayule, a flowering shrub that is used as a secondary source of latex for rubber. Moreover, the material construction of the sections may vary from panel to panel. Thus, one panel may be constructed out of a thicker neoprene with a para-aramid outer layer while a second panel may be constructed out of a thinner neoprene or natural rubber that may be lined with polyester fleece, for instance. It will be appreciated that numerous material construction variations in the panels are possible and may be utilized with the techniques described herein.

Figure 3:
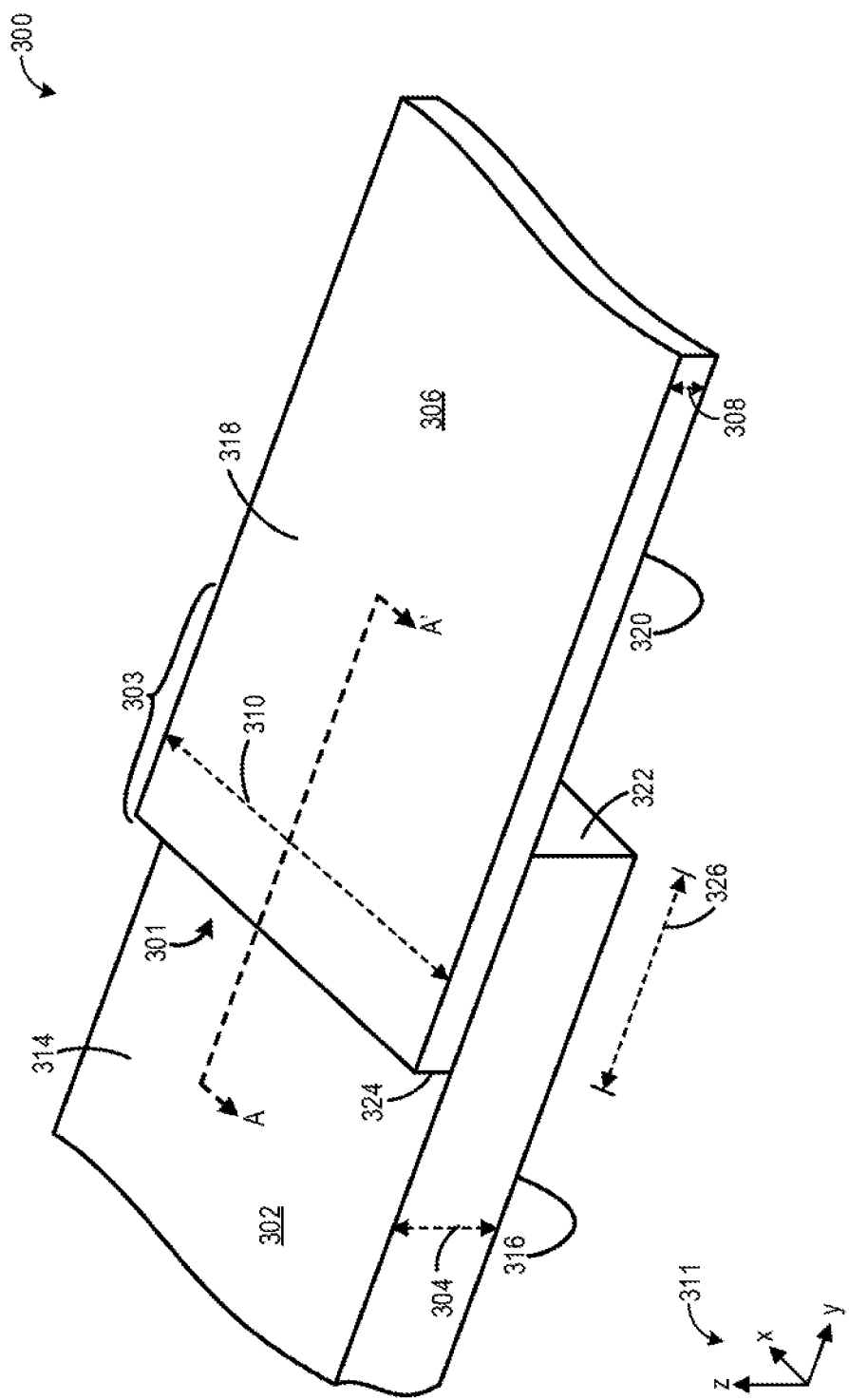
FIG. 3 shows a perspective view of an example of a section of a water sport article, the section including panels that overlap one another to form a joint.
Figure 4:
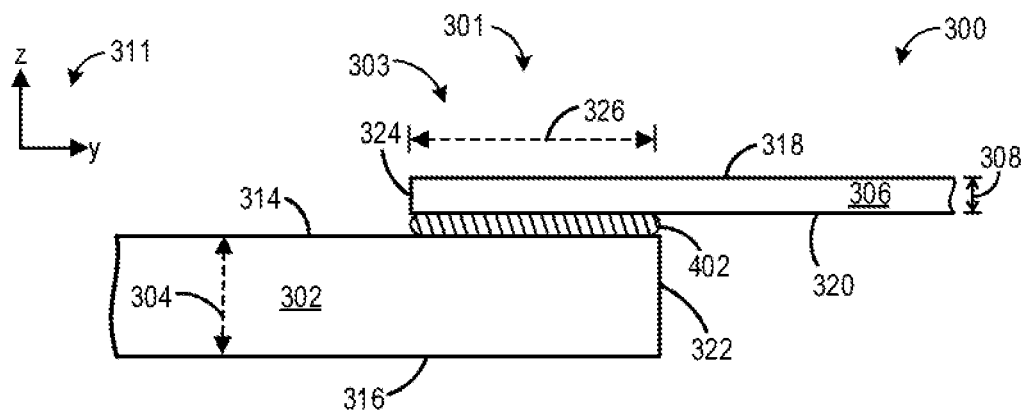
FIG. 4 shows a cross-sectional view of the water sport article section, shown in FIG. 3, where a layer of adhesive is added in the overlapping region of the joint.
Figure 5:
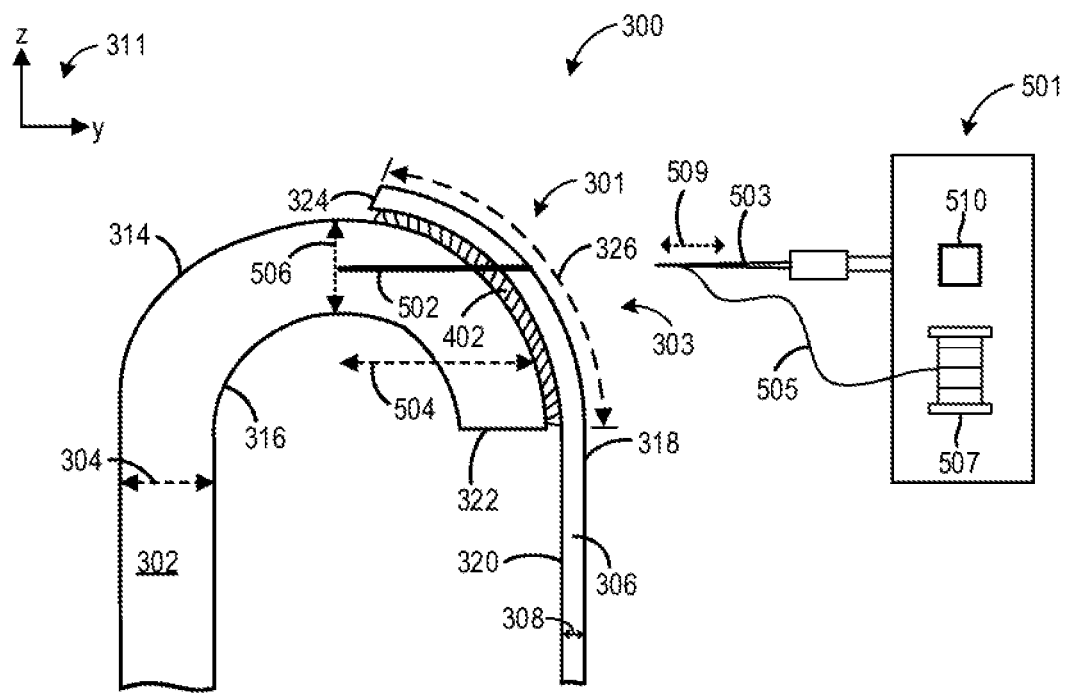
FIG. 5 shows a cross-sectional view of the water sport article section, shown in FIG. 4, where a blind stitch is added in the overlapping region of the joint.
Figure 6:
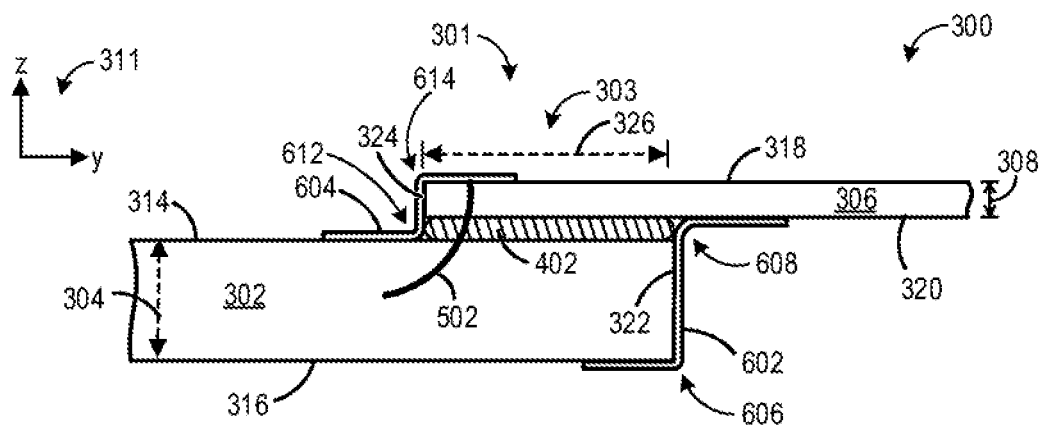
FIG. 6 shows a cross-sectional view of the water sport article section, shown in FIG. 5, where layers of tape are applied to the joint.

Sequential steps in an example of a manufacturing technique are depicted in FIGS. 3-6. Common elements are similarly numbered in FIGS. 3-6. FIG. 3 specifically shows a perspective view of a water sport article section with panels placed over each other such that they overlap and FIGS. 4-6 show cross-sectional views of manufacturing steps where different attachment features are added to the overlapping region of the panels. Reference axes 311 are provided in FIG. 3 as well as FIGS. 4-6 for comparison. The embodiments in FIGS. 7 and 8 also include the reference axes 311. The reference axes 311 include a y-axis, an x-axis, and a z-axis. In one example, the z-axis may be a height axis, the y-axis may be a horizontal axis, and the x-axis may be a lateral axis. However, other orientations of the axes 311 are possible.

Referring specifically to FIG. 3, a water sport article section 300 is illustrated. The water sport article section 300 shown in FIG. 3 is an example of a section that may be included in a water sport article, such as the water sport article 200 (e.g., wetsuit) of FIG. 2. In other examples, the section 300 may be included in other suitable water sport garments such as a drysuits, booties, footwear, hoods, pants, shirts, etc., or in water sport equipment and/or accessories such as bags, backpacks, soft coolers, etc.

The water sport article section 300 includes a joint 301 formed between a first panel 302 (e.g., first insulating panel) and a second panel 306 (e.g., second insulating panel). The joint 301 may function to provide a barrier that reduces (e.g., substantially inhibits) water penetration there through. Various attachment techniques (e.g., stitching, adhesive bonding, and/or taping) for reducing water penetration may be used to attach the panels of the joint and are described in greater detail herein with regard to FIGS. 4-6.

The first panel 302 overlaps the second panel 306 at an overlapping interface 303, in a direction along the z-axis. Thus, in the overlapping interface 303, an edge 322 of the first panel 302 is offset from (in a direction along the y-axis) an edge 324 of the second panel 306. Structuring the section 300 with such an overlap may allow the panels to be attached with a desired degree of waterproofing, flexibility, and/or durability. The overlapping region may have a length, defined along the y-axis, of 1 cm or greater, in one example. However, other overlapping region lengths have been contemplated.

The first panel 302 has a thickness 304, defined along the z-axis, and the second panel 306 has a thickness 308, also defined along the z-axis. As shown in FIG. 3, the thickness 404 is greater than the thickness 308. In one example, the thickness 304 of the first panel 302 may be at least 1 mm greater than a thickness 308 of a second panel 306. For instance, the thickness of the first panel may be 4 mm while the thickness of the second panel may be 3 mm. However, other thickness variances have been contemplated, such as thickness deviations that are greater than 2 mm, 3 mm, 4, mm, 5 mm, etc., between the first panel 302 and second panel 306. For example, the thickness of the first panel may be 5 mm while the thickness of the second panel may be 2 mm. Varying the thickness of the panels in the water sport article section 300 enables variations in flexibility and insulation between the panels to be achieved. Specifically, the first panel 302 may have less flexibility than the second panel 306 and/or the first panel may have greater insulation than the second panel. In this way, flexibility and/or insulation of the panel can be tuned based on end-use goals of the water sport article. For instance, insulating properties may be increased in desired article regions while improving flexibility in other regions, such as panels where ease of movement is more desirable than insulation. Lengths of the first panel 302 and second panel 306, are defined along the y-axis (e.g., horizontal directions) in opposite directions while widths 310 of the first and second panels 302, 306, which is also a width 310 of the joint 301, are defined along the x-axis (e.g., a lateral direction).

The first panel 302 of the water sport article section 300 may have an outer surface 314, and an inner surface 316. Both the outer surface 314 and the inner surface 316 may be parallel to a plane formed by the x-axis and the y-axis. However, other orientations of the outer surface 314 and the inner surface 316 are possible. Furthermore, the outer and inner surfaces of the first panel 302 are planar, in the illustrated example. Non-planar contours of these surfaces, however, may also be utilized. For example, the top surface may have a convex curvature while the bottom surface may have a corresponding concave contour or vice versa. In other examples, the top surface may have a textured profile having a variance in height. As such, the thickness along length and/or width of the first panel 302 may be substantially uniform. Panels having non-uniform thickness, nonetheless, may also be used. The non-uniform panel thickness may stem from large manufacturing tolerances or the panels may be deliberately designed in such a manner. The second panel 306 has an outer surface 318 (e.g., top surface), and an inner surface 320 (e.g., bottom surface). In the illustrated example, the second panel 306 is co-planar with the first panel 302. However, the first and second panels may have other relative orientations. Additionally, a portion of the outer surface 314 of the first panel 302 may be in face-sharing contact with a portion of the inner surface 320 of the second panel 306 in the overlapping interface 303 forming the joint 301, in one example. In this way, the overlapping interface 303 forms a waterproof barrier. However, a layer of adhesive may be positioned between the first panel 302 and the second panel 306, in other instances, such as the example section configuration shown in FIG. 4 and discussed in greater detail herein.

Continuing with FIG. 3, in the overlapping interface 303 of the joint 301, the second panel 306 is arranged above the first panel 302 and an edge 322 of the first panel 302. In the illustrated example, the edge 322 has a planar surface that is aligned with a plane formed by the z-axis and the x-axis, and is spaced away from an edge 324 of the second panel 306, the edge 324 having a planar surface parallel with the planar surface of the edge 322. In other words, the edge 322 and the edge 324 may be staggered. However, in other examples, the edge 322 and/or the edge 324 may not be parallel to one another and/or have a planar contour. A distance, along the y-axis (e.g., a horizontal direction), between the edge 322 of the first panel 302 and the edge 324 of the second panel 306, may delineate a length 326 of the joint 301, which may be 1 cm or greater. Moreover, the thicknesses 304 of the first panel 302 may be measured along a plane formed by the edge 322. Likewise, the thickness 308 of the second panel 306 may be measured along the plane formed by the edge 324. However, the thicknesses of the panels may not be measured along the edges, in other examples. Cross-sectional views of the joint 301 are shown in FIGS. 4-6, taken along line A-A' of FIG. 3.

As shown in FIG. 4, a layer of adhesive 402 may be applied between the inner surface 320 of the second panel 306 and the outer surface 314 of the first panel 302 in the overlapping interface 303 of the joint 301. The layer of adhesive 402 is shown traversing the length 326 of the joint 301. However, the adhesive may only extend along a portion of the length 326 of the joint 301, in other instances, or may be applied at discrete locations (e.g., applied in patches or dots spaced apart from one another across the surface area of the joint 301). For example, the adhesive 402 may not extend all the way to edge 324 and/or edge 322 within the joint 301. The layer of adhesive 402 may be adhesive cement or some other type of adhesive compatible with the material of the water sport article section 300. In one example, when the first and second panels 302, 306 are formed from neoprene, the layer of adhesive 402 may be a layer of neoprene cement. The neoprene cement may provide both secure attachment of the second panel 306 to the first panel 302 of the water sport article section 300 and seal the joint 301. Additionally or alternatively, the first panel 302 and/or the second panel 306 may include a natural rubber material and/or other suitable synthetic rubber material. Natural rubber material is an organic elastic substance which may be obtained from a plant such as a rubber tree. Synthetic rubber is an artificial elastomer which may be synthesized from petroleum byproducts, for instance.

In some examples, the strength of the joint 301 may be increased by increasing the length 326 of the joint 301, e.g., by increasing the amount of overlap between the first panel 302 and the second panel 306 so that the edge 322 of the first panel 302 is spaced further away from the edge 324 of the second panel 306. In this way, the surface areas of the inner surface 320 of the second panel 306 and the outer surface 314 of the first panel 302 in contact with the layer of adhesive 402 may be enlarged, thus increasing the resistance of the joint 301 to forces pulling the first and second panels 302, 306 apart, if desired.

The attachment of the second panel 306 to the first panel 302 at the joint 301 may also be achieved by blind stitching the first panel to the second panel, as shown in FIG. 5. Blind stitching may be defined as a stitching process where stitches are sewn into two pieces of material such that the thread used in the stitching is substantially hidden. In other words, protrusion of the stitches beyond the interface between the joined pieces of material is substantially reduced. A slip stitch or catch stitch worked inside a hem may be used to generate the blind stitch, in some instances. Specifically, in one example, a sewing machine may use a zig-zag stitching pattern to create the blind stitch. However, numerous suitable blind stitching techniques have been envisioned. Prior to or during blind stitching, the water sport article section 300 may be bent so that the joint 301 is convex and the joint 301 is curved outwards with respect to the outer and inner surfaces of the first and second panels 302, 306. Curving the joint 301 outwards may simulate a stretching of water sport article section when worn, if incorporated in a garment, or when surrounding an object. By blind stitching the joint 301 while the joint 301 is bent, stitches of the blind stitching may accommodate stretching and flexing of the material at the joint 301. However, the joint may be blind stitched, in other instances, without bending. Stitching the overlapping panels when they are bent may decrease stitching errors by increasing the margin for error in the sewing process. For instance, stitching misalignment, mistakes in stitching penetration (e.g., stitches that penetrate past a targeted panel depth or fall short of the targeted panel depth), etc., may be reduced when the overlapping panels are sewed while bent in the manner illustrated in FIG. 5. Consequently, the play in the stitching can be decreased, resulting in an increase in the strength of the joint as well as an increase in the joint's waterproofness.

A sewing machine 501 (not drawn to scale) may be used to sew stitches along the joint 301. The sewing machine 501 may include a needle 503, aligned parallel with the y-axis in one example, coupled to a thread 505 that is fed from a bobbin 507 or other suitable thread carrier. However, numerous suitable sewing machine configurations have been contemplated that function to stitch the joint. The needle 503 may pierce the joint 301 to insert the thread 505 into the first and second panels 302, 306, thereby forming stitches. Movement of the needle 503, indicated by arrow 509, may be actuated by an actuator 510 (e.g., motor, mechanical linkage, etc.,) of the sewing machine 501. In other examples of the sewing machine 501, however, more than one needle, and more than one actuator, may be included. In addition, stitches formed from more than one type of thread may be produced by the sewing machine, in some examples. As such, numerous types of sewing machines have been contemplated. In one specific example, the sewing machine may be a Strobel sewing machine generating a Strobel stitch at the joint. Strobel stitching may provide greater flexibility and strength than other types of stitching. However, in other examples, the joint may be hand stitched.

A blind stitch 502 may enter the joint 301 at the outer surface 318 of the second panel 306 at a point that is spaced away from the edge 324. Although a single stitch is shown in FIG. 5, it will be appreciated that a plurality of stitches may be used to attach the first panel 302 to the second panel 306. The plurality of stitches may extend at least partially along the width of the joint. Moreover, additional types of stitching may be used to form a secure interface between the panels such as double blind stitching, flatlock stitching, overlock stitching, etc.

The blind stitch 502 may extend linearly through the entire thickness 308 of the second panel 306 in a direction coaxial with the y-axis, in one example. However, other stitch profiles have been contemplated. The linear extension of the blind stitch 502 may continue into a portion of the thickness 304 of the first panel 302, such as partway through the thickness of the first panel 302. A depth of the extension, indicated by arrow 504, of the blind stitch 502 along the y-axis into the overlapping interface 303 and positioning of the blind stitch 502 relative to the z-axis, may be adjusted so that the blind stitch 502 penetrates into a desired portion of the thickness 304 of the first panel 302. The depth of extension may be determined based on a radius of curvature of the bent joint 301 and a resulting distance, along the y-axis, from a point of entry of the blind stitch 502 along the outer surface 318 of the second panel 306 to a point where the depth of extension may intersect with arrow 506, indicating the thickness of the first panel 302 along a direction coaxial with the z-axis. Arrow 506 may intersect a topmost point, with respect to the z-axis, of the outer surface 314 of the first panel 302. For example, if extension of the blind stitch 502 through a portion of the thickness 304 of the first panel 302 is desired, a length of the blind stitch 502, defined along the y-axis, may be set to match a length indicated by arrow 504 and a positioning of the blind stitch 502 may be adjusted to intersect arrow 506 at an intermediary point (e.g., midpoint) along arrow 506.

When the stitches penetrate partially through the thickness 304 of the material in the first panel 302, the holes formed in the material by the stitching do not fluidly couple an exterior of the material to an interior of the material. Although the stitching does extend through the thickness 308 of the second panel 306, water flowing from outside of the joint 301 into the holes created by stitches penetrating through the second panel 306 may be blocked by the layer of adhesive 402 and/or layers of tape, discussed in greater detail herein. Thus, the stitching may not adversely affect the waterproofness of the water sport article section 300 and blind stitching therefore may form joints (e.g., seams) that are more waterproof than stitching that penetrates through an entire thickness of the material(s).

Upon realigning the water sport article section 300 with the horizontal direction (e.g., unbending or flattening the water sport article section 300), the blind stitch 502 may appear curved in a cross-section of the water sport article section 300, as shown in FIG. 6. However, in other examples, the blind stitch may not be curved. The end point of the blind stitch 502 in the first panel 302 may be offset from the planar surface of the edge 324 of the second panel 306, e.g., not arranged directly below. However, the end point of the blind stitch 502 may not be offset from the edge 324, in other examples. The coupling of the second panel 306 to the first panel 302 at the joint 301 may be further secured and sealed by taping along the edge 324 of the second panel 306 and along the edge 322 of the first panel 302. An inner layer of tape 602 may extend from a point along the inner surface 316 of the first panel 302 that is spaced away from the edge 322 by a distance, to an intersection of the inner surface 316 and the edge 322 and continue up the edge 322, forming a first corner 606 (e.g., perpendicular corner). The inner layer of tape 602 forms a second corner 608 (e.g., perpendicular corner) at an interface of the edge 322 and the inner surface 320 of the second panel 306, continuing a distance along the inner surface 320 of the second panel 306, away from the edge 322. However, an inner layer of tape with only one corner formed at the intersection between the edge 322 and the inner surface 320 is also possible.

An outer layer of tape 604 extends from a point along the outer surface 314 of the first panel 302 that is spaced away from the edge 324 of the second panel 306 by a distance, to an intersection of the outer surface 314 and the edge 324 and continues up the edge 324, forming a first corner 612 (e.g., perpendicular corner). The outer layer of tape 604 also forms a second corner 614 (e.g., perpendicular corner) at an interface of the edge 324 and the outer surface 318 of the second panel 306 and continues a distance along the outer surface 318 of the second panel 306, away from the edge 324, in the illustrated example. However, an outer layer of tape with only one corner formed at the intersection between the edge 324 and the outer surface 314 is also possible.

Both the inner and outer layers of tape 602, 604 may be applied along the entire width 310 of the joint 301, shown in FIG. 3, in some examples. However, in other examples, at least one of the inner and outer layers of tape 602 and 602, respectively, may extend only along a portion of the width 310 of the joint 301 or may include discrete panels spaced away from one another. Continuing with FIG. 6, the tape used to form the inner and outer layers of tape 602, 604, may be a fabric and/or a waterproof material with an adhesive backing. The outer layers of tape 604 may provide a first barrier to water penetration through the joint at the edge 324 of the second panel 306. The inner layer of tape 602 may provide another barrier to water penetration through the joint at an inner side of the joint, along the edge 322 of the first panel 302 to fortify the joint. Alternatively, the layer of adhesive 402 may be supported by either the inner layer of tape 602 or outer layer of tape 604, rather than both.

FIGS. 7 and 8 shows different attachment configurations in joints of water sport panels. It will be appreciated that the water sport article sections shown in FIGS. 7 and 8 may have certain structural and functional features similar to those in the water sport article section 300 illustrated in FIGS. 3-6. As such, description of the common features is omitted to avoid redundancy.

FIG. 7 shows a water sport article section 700 with a joint 702 joining a first panel 704 and a second panel 706 at an overlapping interface 707. A layer of adhesive 708 is applied between (e.g., along the z-axis) an inner surface 710 of the first panel 704 and an outer surface 712 of the second panel 706, is depicted. Additionally, a blind stitch 714 is shown extending through a thickness of the second panel 706 and partially into the first panel 704 at the overlapping interface 707. Although a single stitch is illustrated in FIG. 7, it will be appreciated that a plurality of stitches having selected patterns may be used to join the first and second panels, 704 and 706 respectively, of the water sport article section 700. For example, two or more blind stitches, similar or the same as blind stitch 714 may extend across the overlapping interface 707, in a direction along the y-axis. Stitching and adhesively bonding the joint 702, in combination, allows the joint to be sealed by the layer of adhesive 708 to inhibit water flow through the joint 702 and also fortifies a strength of the coupling of the second panel 706 to the first panel 704.

FIG. 8 shows a water sport article section 800 with a joint 802 joining a first panel 804 and a second panel 806 at an overlapping interface 808. A blind stitch 810 extends through a thickness of the second panel 806 and partially into the first panel 804 at the overlapping interface 808. An outer layer of tape 812 may extend from a point along an outer surface 814 of the first panel 804 that is spaced away from an edge 816 of the second panel 806, to an intersection of the outer surface 814 and the edge 816 and may continue up the edge 816 to form a first corner. The outer layer of tape 812 may form a second corner at an intersection of the edge 816 of the second panel 806 and the outer surface 818 of the second panel 806 and may continue a distance along the outer surface 818 of the second panel 806. An inner layer of tape 820 may extend from a point along an inner surface 822 of the first panel 804 that is spaced away from an edge 824 of the first panel 804, to an intersection of the inner surface 822 and the edge 824 and may continue up the edge 824 to form a first corner. The inner layer of tape 820 may form a second corner at an intersection of the edge 824 of the first panel 804 and the inner surface 826 of the second panel 806 and may continue a distance along the inner surface 826 of the second panel 806. However, other profiles of the first and/or second layer of tape have been contemplated. Additionally, by adding the outer and inner layers of tape 812, 820 in combination with the blind stitching, the strength of the binding of the first panel 804 and the second panel 806 at the joint 802 is further increased and along with the waterproofness of the joint 802.

In other embodiments, the first panel may be coupled to the second panel solely via stitching, adhesive bonding, or taping. Using only one of stitching, adhesive bonding, or taping may provide a cost effective technique for attaching the first panel to the second panel in the water sport article when compared to embodiments using two or more of the attachment techniques. Furthermore, using only stitching, adhesive bonding, or taping to attach the panels of the water sport article may also increase the flexibility of the joint when compared to embodiments utilizing two or more of the attachment techniques. This type of joint configuration may be desirable when design goals focus on increasing joint flexibility, for instance.

FIGS. 1-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Comparative geometric terms such as perpendicular and parallel may be used to refer to portions, sections, etc., of the structures described herein, in some instances.

Turning now to FIG. 9, a method 900 for manufacturing a water sport article is illustrated. Method 900 may be used to manufacture a water sport article such as any of the water sport articles described above with regard to FIGS. 1-8. However, in other examples, the method 900 may be used to construct other suitable water sport articles. As previously discussed, the water sport article may be included in a wetsuit, drysuit, water sport accessory, water sport equipment, water sport footwear, etc. At least a portion of the method steps may be implemented via one or more machines (e.g., sewing machines, adhesive applicators, tape applicators, etc.,) with instructions stored in memory (e.g., non-transitory memory) executable by a processor, in one example. Additionally, a portion of the method steps may be manually implemented via factory personnel, in other examples.

At 902, the method includes attaching a first panel to a second panel at an overlapping interface to form a joint. The first and second panels may include synthetic rubber, natural rubber, and/or another material that provides thermal insulation. In one example, the variation in thickness between the panels may be 1 mm or greater. Further in one example, the second panel may be stacked on top, e.g., outside of, the first panel at the joint. As used herein, "outside" may refer to the portion of the section that faces outward and away from a wearer of the section while an "inside" may refer to the portion of the section that faces inward and toward (or sits against the skin of) the wearer of the section. However, other variations in thickness between the first and second panels in the water sport article have been contemplated. Further, in one example, an edge of the second panel may be spaced away and offset from an edge of the first panel.

Forming the joint may include applying a layer of adhesive between the first and second panels within the overlapping interface at 904. The layer of adhesive bonds an inner surface of the second panel to an outer surface of the first panel. Therefore, the overlapping interface of the first and second panels is both coupled and sealed, e.g., waterproofed, by the layer of adhesive. Furthermore, the layer of adhesive may be applied via an adhesive applicator (e.g., partially or fully automated adhesive applicator), in one instance. However, in other instances the application of adhesive to the water sport article section may be at least partially carried out via manufacturing personnel. For instance, the adhesive applicator may designed for manual operation.

Attaching the first and second panels at the joint may include (in addition to or as an alternative to the application of adhesive at 904) bending the joint and then blind stitching the panels together at 906. In one example, the joint may be bent so that the overlapping interface of the first and second panels is convex, e.g., bent outwards, and then blind stitches may be applied via sewing so that the stitches penetrate through the entire thickness of the second panel, continuing into a portion of the thickness of the first panel. Bending the joint during blind stitching may enable strength and the waterproofness of the joint to be increased by decreasing stitching errors, for instance. However, the joint may be stitched without bending, in other examples. Furthermore, the blind stitching and/or joint bending may be carried out via a sewing machine (e.g., partially or fully automated machine). In other examples, the stitching may be manually implemented by human personnel or the sewing machine may be at least partially manually controlled.

At 908, forming the joint may include (in addition to or as an alternative to the application of adhesive at 904 and/or the blind stitching at 906) applying a first layer of tape along the edge of the second panel. The first layer of tape may extend a distance across the outer surface of the first panel, form a first corner at an intersection of the outer surface of the first panel and the edge of the second panel, continue up the edge of the second panel, form a second corner at an intersection of the edge and the outer surface of the second panel, and continue a distance along the outer surface of the second panel.

Additionally or alternatively, a second layer of tape may extend a distance across the inner surface of the first panel, form a first corner at an intersection of the inner surface of the first panel and the edge of the first panel, continue up the edge of the first panel, form a second corner at an intersection of the edge and the inner surface of the second panel, and continue a distance along the inner surface of the second panel. By adding the first and/or second layers of tape to outer and inner edges of the overlapping interface, the joint is further sealed to block water and increase insulating properties of the joint. Furthermore, the layers of tape may be added to the joint via a tape applicator (e.g., partially or fully automated tape applicator) or may be physically applied by a worker. Additionally, the adhesive applicator, sewing machine, and/or tape applicator may be discrete machines. However, in other examples, the adhesive applicator, sewing machine, and/or tape applicator may share a common housing and/or utilize common components.

Method 900 enables a robust joint to be formed between a first, thicker panel and a second, thinner panel of a water sport article. Specifically, a stronger and more waterproof joint is formed in the water sport article when adhesive bonding, blind stitching, and/or taping is used to attach the overlapping panels in the joint with respect to prior joints such as joints with edge-to-edge coupling of panels with equivalent thicknesses. Consequently, the thicknesses of panels in a water sport article section can be varied to facilitate targeted adjustments in panel flexibility and/or insulation without negatively impacting the strength or waterproofing of the joint. In this way, the water sport article's adaptability is increased, thereby enabling the water sport article to be used in a wide variety of water sports products (e.g., garments, accessories, equipment, etc.,) with different end-use characteristics, if desired.

The technical effect of providing a water sport article with a joint formed by overlapping panels with varying thicknesses attached via blind stitching, adhesive bonding, and/or taping is to provide an article with a desired amount of waterproofness and flexibility. In this way, the water sport article can achieved targeted end-use characteristics, thereby increasing the customer appeal of the article.

The invention will be further described in the following paragraphs. In one aspect, a water sport article is provided that includes a joint formed between a first panel and a second panel comprising, an overlapping interface where a surface in each of the first panel and the second panel are adjacent to one another, an edge of the first panel is offset from an edge of the second panel, the first panel is thicker than the second panel, and the thickness is aligned along a same plane as the edges of the first and second panels, wherein the first panel is attached to the second panel by at least one or more of adhesive bonding, blind stitching, and taping.

In another aspect, a wetsuit is provided that includes a first insulating panel having a thickness, an outer surface, an inner surface opposite the outer surface, and an edge, and a second insulating panel having a thickness, an outer surface, an inner surface opposite the outer surface, and an edge, where the thickness of the first insulating panel is greater than the thickness of the second insulating panel, wherein the first insulating panel overlaps the second insulating panel in an overlapping interface such that the edge of the second insulating panel is spaced apart from the edge of the first insulating panel and the first insulating panel is arranged below the second insulating panel in the overlapping interface, and wherein the first insulating panel is blind stitched to the second insulating panel at the overlapping interface using a plurality of blind stitches.

In yet another aspect, a method of manufacturing a water sport article is provided that includes attaching a first panel to a second panel at an overlapping interface to form a joint that is substantially waterproof and flexible, wherein the first panel has a greater thickness than the second panel, wherein each of the first and second panels include an outer surface, an inner surface, and an edge, and wherein the edge of the first panel offset from the edge of the second panel. In one example, the method may further include attaching the first panel to the second panel includes applying a layer of adhesive to at least one of the outer surface of the first panel and the inner surface of the second panel. In another example, the method may further include bending the overlapping interface during or prior to blind stitching the first panel to the second panel. In another example, the method may further include blind stitching the first panel to the second panel includes sewing a plurality of stitches in the overlapping interface such that the plurality of stitches extend completely through the thickness of the second panel and through only a portion of the thickness of the first panel. In another example, the method may further include attaching the first panel to the second panel includes applying a layer of tape along at least a portion of a length of the edge of the first panel and/or the edge of the second panel, and wherein the layer of tape extends across a depth of the edge in the first panel and/or the second panel. In another example, the method may further include the first panel and the second panel including at least one of a natural rubber material and a synthetic rubber material.

In yet another aspect, a waterproof article is provided with a joint formed between a first panel and a second panel comprising an overlapping interface where a surface in each of the first panel and the second panel are adjacent to one another and where an edge of the first panel is offset from an edge of the second panel, the first panel thicker than the second panel, the thickness aligned along a same plane as the edges of the first and second panels, wherein the first panel is attached to the second panel by at least one or more of adhesive bonding, blind stitching, and taping.

In any of the aspects or combinations of the aspects, the water sport article may be included in a water sport garment.

In any of the aspects or combinations of the aspects, the adhesive bonding and/or taping may seal the joint and wherein the sealing may block water from flowing through the joint and may maintain flexibility between the first panel and the second panel at the joint.

In any of the aspects or combinations of the aspects, the joint may be arranged in a plurality of regions of the water sport article corresponding to articulation of a user's body in an as-worn position.

In any of the aspects or combinations of the aspects, the first panel may be less flexible and elastic than the second panel of the joint.

In any of the aspects or combinations of the aspects, the first panel may be attached to the second panel by blind stitching and the joint is sealed by adhesive bonding.

In any of the aspects or combinations of the aspects, the first panel may be attached to the second panel by blind stitching the joint is sealed by taping.

In any of the aspects or combinations of the aspects, the first panel may be attached to the second panel by blind stitching and the joint is sealed by adhesive bonding, and taping.

In any of the aspects or combinations of the aspects, the joint may be sealed only by adhesive bonding.

In any of the aspects or combinations of the aspects, the first panel may be attached to the second panel by blind stitching and not sealed.

In any of the aspects or combinations of the aspects, the first panel and the second panel may include at least one of a natural rubber material and a synthetic rubber material.

In any of the aspects or combinations of the aspects, the first insulating panel may be adhesively bonded to the second insulating panel in the overlapping interface via a layer of adhesive.

In any of the aspects or combinations of the aspects, the first insulating panel may be taped to the second insulating panel via a layer of tape extending along at least a portion of a length of the edge of the first insulating panel and/or the edge of the second insulating panel.

In any of the aspects or combinations of the aspects, the inner surface of the second insulating panel may be in face sharing contact with the outer surface of the first insulating panel at the overlapping interface.

In any of the aspects or combinations of the aspects, a difference between the thickness of the first insulating panel and the thickness of the second insulating panel may be 1 millimeter or greater.

In any of the aspects or combinations of the aspects, stitches of the blind stitching may enter the second panel at a distance away from the edge of the second panel and penetrate an entire thickness of the second panel at angle relative to the vertical plane.

In any of the aspects or combinations of the aspects, stitches of the blind stitching, upon exiting the second panel, may enter the first panel at a distance away from the edge of the first panel that is equal to or greater than the length of the overlapping region and penetrating through a portion of the thickness of the first panel.

In any of the aspects or combinations of the aspects, a thickness of the first panel may differ from a thickness of the second panel by greater than or equal to 1 mm.

In any of the aspects or combinations of the aspects, the waterproof article may be a wetsuit.

In any of the aspects or combinations of the aspects, the second panel may be thinner than the first panel.

In any of the aspects or combinations of the aspects, a variance in thickness between the first panel and the second panel may be greater than or equal to 1 mm.

In any of the aspects or combinations of the aspects, attaching the first panel to the second panel may include blind stitching the first panel to the second panel at the overlapping interface, wherein the method may further comprise bending the overlapping interface during or prior to blind stitching the first panel to the second panel, and wherein blind stitching the first panel to the second panel may include sewing a plurality of stitches in the overlapping interface such that the plurality of stitches extend completely through the thickness of the second panel and through only a portion of the thickness of the first panel.

In another representation, a water sport article is provided includes an overlaying interface between two thermally insulative material sections having a variance in thickness, where the two material sections are joined to one another using blind stitching, adhesive bonding, and/or taping.

It will further be appreciated by those skilled in the art that although the invention has been described by way of example with reference to several embodiments it is not limited to the disclosed embodiments and that alternative embodiments could be constructed without departing from the scope of the invention as defined in the appended claims.

As used herein, the term "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A wetsuit, comprising:
   a joint formed between a first panel having a first thickness and a second panel having a second thickness, each of the first thickness and the second thickness being substantially uniform along an entire length of the respective first panel and second panel, the joint comprising:
   an overlapping interface where surfaces of a first end of the first panel and a first end of the second panel are adjacent to one another, an edge of the first end of the first panel is offset from an edge of the first end of the second panel, the first thickness of the first panel is thicker than the second thickness of the second panel, and a thickness of the overlapping interface is greater than the first thickness and the second thickness;
   wherein the first panel is attached to the second panel by adhesive bonding and blind stitching, the blind stitching placed while the overlapping interface is bent and including a plurality of blind stitches each having an arcuate concave cross-section extending entirely through the second thickness of the second panel, a layer of adhesive of the adhesive bonding, and to an end point disposed within the first panel, the end point extending away and inset from the edge of the first panel and offset in a direction away from the edge of the second panel.

2. The wetsuit of claim 1, wherein the adhesive bonding seals the joint and wherein the sealing blocks water from flowing through the joint and maintains flexibility between the first panel and the second panel at the joint.

3. The wetsuit of claim 1, wherein the joint is arranged in at least one of a chest region, an elbow region, and a knee region of the wetsuit corresponding to articulation of a user's body in an as-worn position.

4. The wetsuit of claim 1, wherein the first panel is less flexible than the second panel of the joint.

5. The wetsuit of claim 1, wherein the adhesive bonding seals the joint.

6. The wetsuit of claim 1, where the first panel and the second panel include at least one of a natural rubber material and a synthetic rubber material.

7. The wetsuit of claim 1, wherein each of the first panel and the second panel has a bent configuration, the first panel attached to the second panel via the plurality of blind stitches in the bent configuration of each of the first panel and the second panel.

8. The wetsuit of claim 7, wherein stitching of the blind stitching includes a linear extension defined through an entirety of the second thickness of the second panel and partially defined through a portion of the first thickness of the first panel.

9. The wetsuit of claim 8, wherein the bent configuration of the first panel and the second panel defines a bent joint of the joint, the linear extension of each of the plurality of blind stitches corresponding to a depth of the plurality of blind stitches relative to a radius of curvature of the bent joint.

10. The wetsuit of claim 1, wherein a second end of the first panel is free from contact with a second end of the second panel.

11. The wetsuit of claim 1, wherein the adhesive bonding includes adhesive disposed at discrete locations across a surface area of joint.

* * * * *